United States Patent
Johnston

[11] 3,880,009
[45] Apr. 29, 1975

[54] PRESSURE TRANSDUCER

[75] Inventor: Samuel Andrew Johnston, Fontana, Wis.

[73] Assignee: Bunker Ramo Corporation, Oak Brook, Ill.

[22] Filed: May 24, 1973

[21] Appl. No.: 363,446

[52] U.S. Cl. .............................. 73/398 C; 73/407
[51] Int. Cl. ............................................. G01l 9/12
[58] Field of Search .......... 73/398 C, 398 AR, 406, 73/407, 431; 317/246; 181/31 R

[56] References Cited
UNITED STATES PATENTS

| | | | |
|---|---|---|---|
| 2,714,703 | 8/1950 | Ruderfer | 73/398 C |
| 2,751,530 | 6/1956 | Armstrong | 73/398 C |
| 2,999,385 | 9/1961 | Wolfe | 73/407 R |
| 3,479,879 | 11/1969 | Music | 73/398 C |
| 3,620,083 | 12/1969 | Dimeff et al. | 73/406 |

Primary Examiner—Donald O. Woodiel
Attorney, Agent, or Firm—David R. Bair; F. M. Arbuckle

[57] ABSTRACT

Flexible conductive diaphragm is sealed to a flat dielectric substrate and spaced above a fixed plate on the substrate. Diaphragm and plate constitute a capacitor, the capacitance of which varies as the spacing between diaphragm and plate changes. The variable capacitor, coupled to associated circuitry mounted on the substrate, causes corresponding changes in the output signal from the circuit. A cap, sealed to the substrate, provides a chamber outside the diaphragm into which a pressure medium can be introduced through a tubing connection. A second tubing connection gives similar access to the space enclosed between the diaphragm and the substrate. The two connections permit the device to be used as a differential gage, as a normal gage, as a barometer, or as an absolute gage.

6 Claims, 3 Drawing Figures

3,880,009

PRESSURE TRANSDUCER

BACKGROUND OF THE INVENTION

Variations in pressure can be made to change the capacitance of an appropriate sensing device. Such a device can be provided by making one of the plates of a capacitor a movable or flexible member, such as a diaphragm. If the diaphragm is located closely adjacent to a second, fixed plate, and one side of the diaphragm is exposed to the pressure to be sensed, variations in that pressure will be reflected as changes in the capacitance between the diaphragm (movable plate) and the fixed plate. The variable capacitor thus constituted can be connected to an appropriate electronic circuit, to provide a circuit output which has parameters changing in accordance with the variance in pressure. For example, the changing capacitance may be used to change the operating frequency of an oscillator circuit. A transducer based on this general principle is the subject of U.S. Pat. No. 3,808,480, filed Apr. 16, 1973 assigned to the present assignee of this application.

The variable frequency signal can be passed through a discriminator to obtain an analog output, or through a gated counter to obtain a digital output. Systems of these types are disclosed in U.S. Pat. Nos. 3,295,360 and 3,595,084.

The present invention is a refinement in systems of the kind described, by which important advantages are gained in manufacturing economy, in versatility of application, and in obtaining a substantial change of capacitance for a given change of pressure, in a device of small size and weight.

BRIEF SUMMARY OF THE INVENTION

A flat dielectric substrate is provided with a "printed" conductive land constituting a fixed plate on one surface of the substrate. An electrically conductive, flexible diaphragm mounted over the land has an upstanding peripheral flange which spaces the central portion of the diaphragm away from the fixed plate. The diaphragm is hermetically sealed to the substrate, with its flange surrounding and spaced from the fixed plate. The diaphragm in combination with the central fixed plate, comprises a variable capacitor. Circuitry for converting the varying capacitance to a correspondingly varying electrical signal is located on the substrate closely adjacent the diaphragm. A suitable housing or cap surrounds the diaphragm, is sealed to the substrate and provides a chamber by which the diaphragm may be subjected to a pressure medium as desired. A port is provided by which connection can be made to the chamber for introducing the pressure medium.

To enable the device to function as a differential pressure sensor, a second port is provided by which connection can be made to introduce a pressure medium into the space enclosed between the diaphragm and the substrate. This port is provided at or near the periphery of the fixed plate, where any necessary removal of the conductive land material comprising the fixed plate of the capacitor will have minimum effect upon the change in capacitance between the diaphragm and the fixed plate as a function of pressure changes.

DETAILED DESCRIPTION

Figure 1:
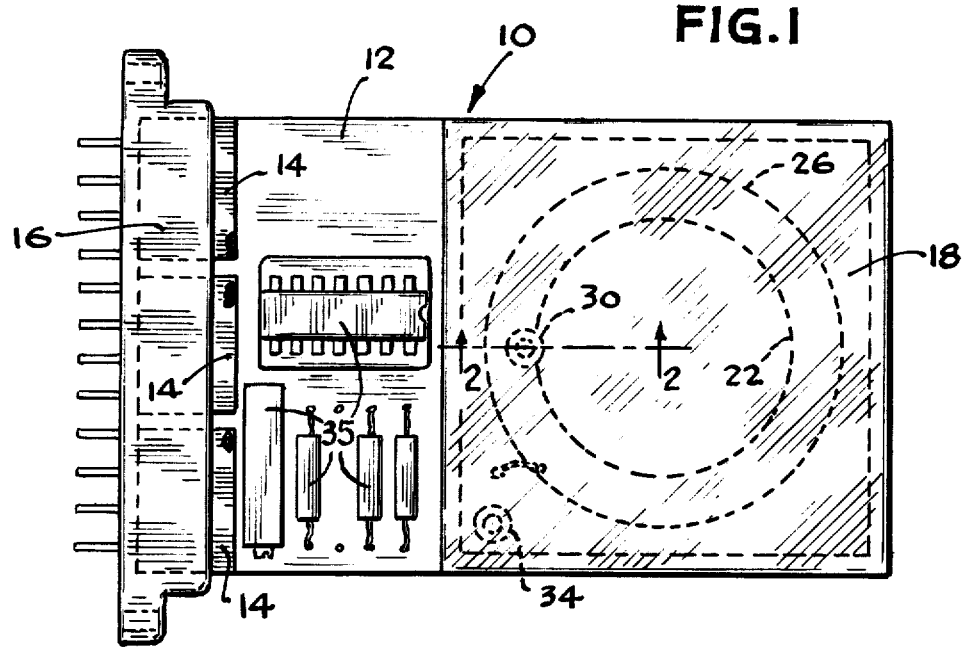
FIG. 1 is a plan view of a pressure sensor embodying the invention.

The pressure sensor shown in FIG. 1 is designated generally by the reference numeral 10. It is constructed on a flat substrate 12 which may be a dielectric material of the kind used for conventional printed circuits; any material having the necessary electrical and mechanical properties throughout the range of environmental conditions to which the device will be exposed, can be used. It must not be adversely affected by the pressure medium with which the device is to be used, and must be impermeable to it. For many purposes, a glass-filled melamine is a suitable material. The substrate carries terminal contact conductor areas 14, which are shown as inserted in a conventional printed circuit connector 16, through which connections are made for power supply and signal output.

The substrate 12 carries a land of conductive material constituting a fixed plate 22, formed on the substrate by conventional printed circuit methods. Surrounding the fixed plate 22 and separated from the periphery thereof by a space 24, is a diaphragm 26 of an electrically conductive material, preferably a thin, flexible metal, sealed to the substrate. The diaphragm has an axial peripheral flange 28 by which its central portions are spaced away from the fixed plate sufficiently so that it will not touch the fixed plate under the maximum excursions of the diaphragm in response to the pressure changes which are to be sensed. A cap 18 preferably made of a dielectric material is hermetically sealed to the substrate, enclosing the diaphragm 26 and forming around it a chamber 20.

In the form of the device shown in the drawings, a short section of tubing 30 is affixed to the substrate, in communication with a hole aperture 32 running through the substrate into the annular area between the periphery of plate 22 and the flange 28 of diaphragm 26. The tube 30 provides a port by which a suitable hose or other tubing connection can be made, to introduce a pressure medium into the space enclosed between the diaphragm 26 and the substrate 12.

A similar tube 34, communicating with another opening running through the substrate 12, gives a port into the chamber 20 outside the diaphragm 26 and provides means for introducing a desired pressure medium into that space. It will be understood that it is not essential to have this port extend through the substrate; it can equally well be made through a wall 37 of the cap 18.

The diaphragm is thus subject to the difference of the pressures communicated through the tube connections 30 and 34, and due to its flexible nature, will change its spacing with respect to fixed plate 22, in response to the pressure differentials which it experiences.

Figure 3:
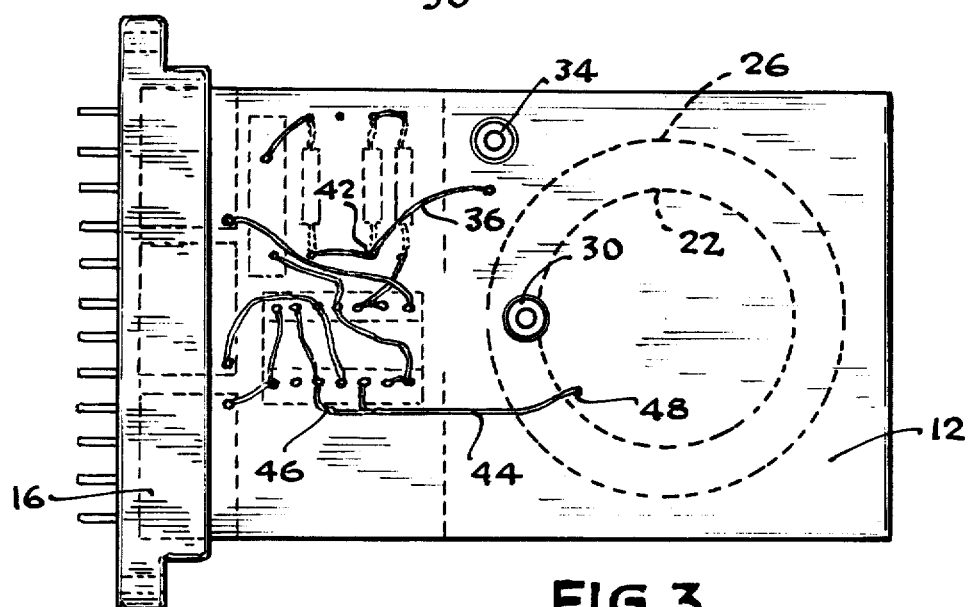
FIG. 3 is a view similar to that in FIG. 1, but showing the reverse side of the pressure sensor.

The necessary components 35 for an electronic circuit utilizing the variable capacitance arising from this change in spacing, are mounted on the substrate 12 closely adjacent to the cap 18, as shown particularly in FIG. 1. Appropriate circuits for this purpose are well known, and do not constitute a part of the present invention. A suitable circuit has been shown in U.S. Pat. No. 3,808,480, referred to above. Printed circuit or other conductors can be provided on the reverse side of substrate 12 to interconnect the circuit elements. One such conductor, 36, shown in FIG. 3, leads from a wire 38, soldered to the diaphragm at 40, and makes connection to appropriate elements of the oscillating circuit at point 42. Conductor 44 leads from a connection to the oscillating circuit at 46 to a connection through the substrate at 48 leading to the fixed plate 22.

The structure described provides in very small size a device which is compact, light in weight, economical to manufacture, and which has considerable versatility. It can be used in the manner which has been described, to sense the difference between two pressures communicated to the tube connections 30 and 34, thus functioning as a differential gage. It may also be used as a normal pressure gage, by leaving one connection open to atmosphere, and applying a pressure to be sensed to the other connection. As still another alternative, one of the connections may be pumped down and sealed off as a partial vacuum, in which case, if the other connection is exposed to atmosphere, the device functions as a barometer, or if a pressure medium is connected to it, it functions as an absolute pressure gage.

In description of the tubing connection 30, it was noted that the opening through the substrate is into the area at or near the periphery of the fixed plate 22. This arrangement is preferred, because to the extent that removal of some of the plate 22 is required to give access to the contained space, it is desirable to have that reduction in plate area made in a region where it causes a minimum loss in the capacitance change occurring with a given change in pressure. Maximum movement of the diaphragm with respect to the fixed plate takes place at the center of the diaphragm, so it is not desirable to remove conductive material from the fixed plate for a port in that region; the location at the periphery, where little change takes place in spacing between facing parts of the diaphragm and fixed plate, is preferable.

Figure 2:
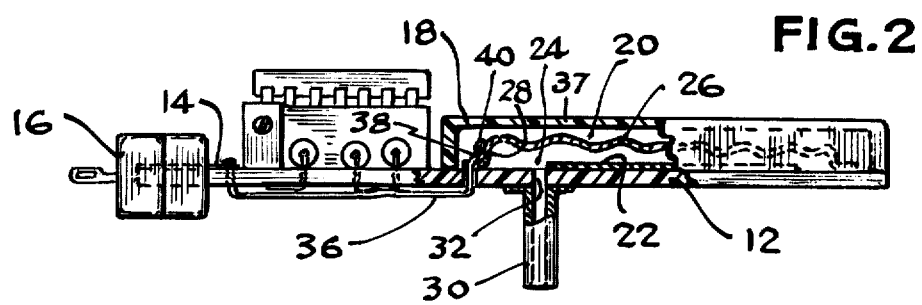
FIG. 2 is a side elevational view, partly in section taken on the line 2—2 of FIG. 1.

Making the cap 18 of a dielectric material has the virtue of avoiding an undesirable stray capacitance from the diaphragm to the housing, such as would be present if a metal cover were used. On the other hand, if shielding from external fields is necessary, a metal cap may be used; in such a case it would preferably be made larger, so that its walls would be spaced further from the diaphragm than the cap shown in FIG. 2, in order to reduce the stray capacitance between cap and diaphragm.

I claim:

1. A variable capacitance type pressure transducer comprising:
   a substrate of dielectric material,
   a land of electrically conductive material affixed thereto,
   a flexible electrically conductive diaphragm covering said land, spaced therefrom, and sealed to said substrate, said land and said diaphragm forming two plates of a capacitor,
   a cap covering said diaphragm, spaced therefrom and sealed to said substrate,
   a port providing communication for a pressure medium to the otherwise closed volume surrounding said diaphragm and defined by said cap and said substrate, from the space external thereto,
   a port providing communication for a pressure medium to the otherwise closed volume defined by said diaphragm and said substrate, from the space external thereto, and electrical circuit means mounted on said substrate, connected to said diaphragm and to said land, and adapted to produce a signal having characteristics varying as a function of the capacitance between said diaphragm and said land.

2. A variable capacitance type pressure transducer comprising:
   a substrate of electrically non-conductive material impermeable to gas, said substrate having first and second faces spaced apart by the thickness of said substrate,
   a land of electrically conductive material affixed to said first face,
   a thin flexible electrically conductive diaphragm impermeable to gas, hermetically sealed to said first face in spaced apart relation to and covering said land, said land and said diaphragm forming two plates of an electrical capacitor,
   a cap comprised of a gas impermeable material hermetically sealed to said first face in spaced apart relation to and covering said diaphragm,
   an aperture running through the thickness of said substrate at a position on said first surface which is embraced by said diaphragm,
   gas porting means for the otherwise closed volume surrounding said diaphragm which is defined by said cap and said substrate, and
   electrical circuit means mounted on said substrate, connected to said land and said diaphragm, and adapted to produce a signal having characteristics varying as a function of the capacitance between said land and said diaphragm.

3. A variable capacitance type pressure transducer comprising:
   a substrate of electrically non-conductive material impermeable to gas, said substrate having first and second faces spaced apart by the thickness of said substrate,
   a land of electrically conductive material affixed to said first face,
   a thin flexible electrically conductive diaphragm impervious to gas, hermetically sealed to said first face in spaced apart relation to and covering said land, said land and said diaphragm forming two plates of an electrical capacitor,
   a cap comprised of a gas impermeable material hermetically sealed to said first face in spaced apart relation to and covering said diaphragm,
   a first aperture running through the thickness of said substrate at a position on said first face which is embraced by said diaphragm,
   a second aperture running through the thickness of said substrate at a position on said first face between the inner extremity of said cap and the outer extremity of said diaphragm,
   and tubular fittings mounted on said second face, each connecting respectively with one of said apertures.

4. A variable capacitance type pressure transducer comprising:

a substrate of electrically non-conductive material impermeable to gas, said substrate having first and second faces spaced apart by the thickness of said substrate, a land of electrically conductive material affixed to said first face, a thin flexible electrically conductive diaphragm impervious to gas, hermetically sealed to said first face in spaced apart relation to and covering said land, said land and said diaphragm forming two plates of an electrical capacitor, a cap comprised of a gas impermeable material hermetically sealed to said first face in spaced apart relation to and covering said diaphragm, a first aperture running through the thickness of said substrate at a position on said first face which is embraced by said diaphragm, a second aperture running through the thickness of said substrate at a position on said first face between the inner extremity of said cap and the outer extremity of said diaphragm, electrical components mounted on said substrate forming a circuit responsive to capacitance changes to develop an output signal the characteristics of which change as a function of capacitance change, and electrical conductors running from said land and said diaphragm to said electrical components.

5. Apparatus according to claim 3 wherein said first aperture runs through the thickness of said substrate at a position on said first face which is embraced by said diaphragm and is immediately adjacent the outer periphery of said land.

6. A variable capacitance type pressure transducer comprising:

a substrate of electrically nonconductive material impermeable to gas, said substrate having first and second faces spaced apart by the thickness of said substrate, a land of electrically conductive material affixed to said first face, a thin flexible electrically conductive diaphragm impervious to gas, hermetically sealed to said first face in spaced apart relation to and covering said land, said land and said diaphram forming two plates of an electrical capacitor, a cap comprised of a gas impermeable material hermetically sealed to said first face in spaced apart relation to and covering said diaphragm, a first aperture running through the thickness of said substrate at a position on said first face which is embraced by said diaphragm, a second aperture running through the thickness of said substrate at a position on said first face between the inner extremity of said cap and the outer extremity of said diaphragm, electrical components mounted on said substrate forming a circuit responsive to capacitance changes to develop an output signal the characteristics of which change as a function of capacitance change, and electrical conductors extending from said land and from said diaphragm to said electrical components.

* * * * *